United States Patent
Ullmann et al.

(10) Patent No.: US 6,856,333 B2
(45) Date of Patent: Feb. 15, 2005

(54) PROVIDING A USER INTERACTIVE INTERFACE FOR PHYSICALLY IMPAIRED USERS DYNAMICALLY MODIFIABLE RESPONSIVE TO PRELIMINARY USER CAPABILITY TESTING

(75) Inventors: Cristi Nesbitt Ullmann, Austin, TX (US); Lorin Evan Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 622 days.

(21) Appl. No.: 09/845,471

(22) Filed: Apr. 30, 2001

(65) Prior Publication Data

US 2002/0180813 A1 Dec. 5, 2002

(51) Int. Cl.⁷ ................................................. G09G 5/00
(52) U.S. Cl. ..................... 345/865; 345/702; 345/705; 345/789; 345/707; 345/856; 345/857; 345/858
(58) Field of Search ................................. 345/157, 159, 345/163, 702, 705, 707, 789, 856, 857, 858, 860, 861, 862, 865; 707/6

(56) References Cited

U.S. PATENT DOCUMENTS

| | | | | |
|---|---|---|---|---|
| 5,642,131 A | * | 6/1997 | Pekelney et al. | 345/862 |
| 5,757,358 A | * | 5/1998 | Osga | 345/862 |
| 5,808,604 A | * | 9/1998 | Robin | 345/862 |
| 5,870,079 A | * | 2/1999 | Hennessy | 345/159 |
| 5,933,138 A | * | 8/1999 | Driskell | 345/702 |
| 6,046,722 A | * | 4/2000 | McKiel, Jr. | 345/862 |
| 6,587,131 B1 | * | 7/2003 | Nakai et al. | 345/857 |

FOREIGN PATENT DOCUMENTS

RU    2164382 C2 *  3/2001  ......... A61B/10/00

* cited by examiner

Primary Examiner—Kristine Kincaid
Assistant Examiner—Boris Pesin
(74) Attorney, Agent, or Firm—J. B. Kraft; Leslie A. VanLeeuwen

(57) ABSTRACT

Enhancing access for physically impaired users to selectable items in a hierarchical arrangement through the preliminary testing of a user response time in moving a user controlled on-screen pointer from a start point over an equal distance to each of a plurality of said selectable items of different sizes in combination with implements responsive to this preliminary testing means for sizing a set of items in said hierarchical arrangement to provide said user with enhanced access to said items in said set.

Access for the physically impaired is even further enhanced through preliminary testing of a user response time in moving a user controlled on-screen pointer from a start point over an equal distance to each of a plurality of said selectable items wherein each item is located within a region of different item layout spacing, in combination with an implement responsive to said preliminary testing means for spacing a set of items in said hierarchical arrangement to provide said user with enhanced access to said items in said set.

There is a further provision for listening for predetermined events in the operation of said display system and means responsive to said predetermined events for triggering said means for preliminary testing during said system operation. Likewise, there are means for listening for predetermined events in the operation of said display system in combination with means responsive to said predetermined events for triggering said means for preliminary testing during said system operation.

18 Claims, 5 Drawing Sheets

PROVIDING A USER INTERACTIVE INTERFACE FOR PHYSICALLY IMPAIRED USERS DYNAMICALLY MODIFIABLE RESPONSIVE TO PRELIMINARY USER CAPABILITY TESTING

CROSS REFERENCE

U.S. patent application Ser. No. 09/845,463 entitled PROVIDING ALTERNATE ACCESS FOR PHYSICALLY IMPAIRED USERS TO ITEMS NORMALLY DISPLAYED IN DROP DOWN MENUS ON USER INTERACTIVE DISPLAY INTERFACES having the same inventors and assignee of the present application and filed concurrently herewith and hereby incorporated by reference.

TECHNICAL FIELD

The present invention relates to user-interactive computer supported display technology and particularly to such user-interactive systems and methods which are user friendly and provide physically and visually impaired computer users with an interface environment that is easy to use, particularly with respect to screen cursor movements.

BACKGROUND OF RELATED ART

The past decade has been marked by a technological revolution driven by the convergence of the data processing industry with the consumer electronics industry. This advance has been even further accelerated by the extensive consumer and business involvement in the Internet over the past several years. As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

However, even more significant than these advances in opening new horizons to the general population has been the ability of the computer and the Internet to rescue people with even very severe physical impairments from lives of limited menial or no productivity. With the computer, any impaired person with even slight dexterity or vision may, with sufficient effort, be capable of becoming as fully productive from his desktop as a person with full dexterity or vision.

This is possible because, unlike the workplaces of the past which presented global or universal working conditions where each worker had to adjust to thereby eliminate most physically or visually impaired people, the computer may be tailored to the unique abilities of each physically impaired individual. To this end, the computer industry is continuously seeking new implementations to bring more and more physically impaired individuals into full productivity in the workforce.

One source of frustration to physically and visually impaired computer users has been movement of the screen cursor and movable screen indicia to make the required user-interactive selections. Despite all of the great changes that have been made in the computer industry, the screen cursor controlled manually by the user still remains the primary human-computer interface. The user still commands the computer primarily through manual pointing devices such as mice, joysticks and trackballs that control the on-screen cursor movements. It must be noted that the principles involved in such pointing devices were developed over a generation ago when most of the people involved in interfaces to computers were computer professionals who were willing to invest great amounts of time in developing computer skills. It is very possible that had computers originally been the mass consumer, business and industry implements which they are today, user interfaces which were much easier and required less skill to use would have been originally sought and developed. Nonetheless, the manually controlled cursor movement devices remain our primary implement for cursor control. The present invention is directed to making mouse, trackball and like cursor control devices more user friendly and effective for the physically and visually impaired.

Cursor control devices, such as the mouse, translate relatively precise orthogonal manual movements into precise cursor movements on the display screen. Users with poor hand-eye coordination due to poor eyesight, physical impairment, feebleness or other dexterity problems find the computer mouse to be quite stressful and frustrating.

The above-referenced copending application is directed to interactive computer controlled display systems and particularly to methods in such systems for making the cursor easier to use and control in making on-screen movements and selections of displayed objects such as icons. The copending application provides alternate access for physically impaired users to items normally displayed in drop down menus through a hierarchical tree arrangement of selectable items corresponding to items in said set of menus. The selectable items in the tree are icons and, particularly, icons varied in size so as to be optimized to diminish the effects of the individual user's impairment. For the same effect, the icons in the tree may also be varied in distance, i.e. spaced from each other so as to be optimized to diminish the effects of the individual user's impairment.

SUMMARY OF THE PRESENT INVENTION

The present invention supplements the copending application by enhancing such access for physically impaired users to selectable items in a hierarchical arrangement through means for the preliminary testing of a user response time in moving a user controlled on-screen pointer from a start point over an equal distance to each of a plurality of said selectable items of different sizes in combination with means responsive to this preliminary testing means for sizing a set of items in said hierarchical arrangement to provide said user with enhanced access to said items in said set.

This invention likewise provides means for the preliminary testing of a user response time in moving a user controlled on-screen pointer from a start point over an equal distance to each of a plurality of said selectable items wherein each item is located within a region of different item layout spacing in combination with means responsive to said preliminary testing means for spacing a set of items in said hierarchical arrangement to provide said user with enhanced access to said items in said set.

There is a further provision for means for listening for predetermined events in the operation of said display system and means responsive to said predetermined events for triggering said means for preliminary testing during said system operation. Likewise, there are means for listening for predetermined events in the operation of said display system in combination with means responsive to said predetermined events for triggering said means for preliminary testing during said system operation.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
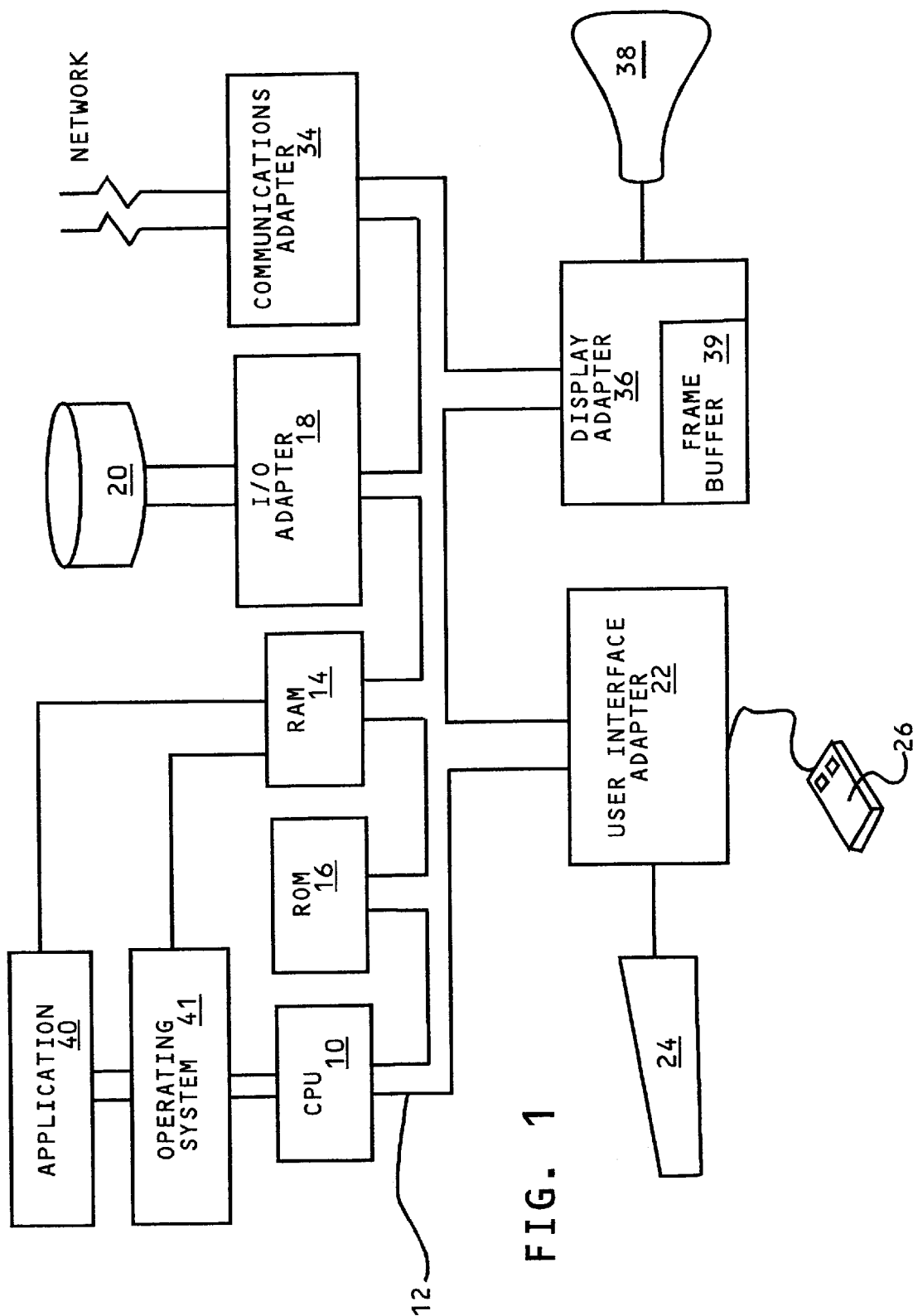
FIG. 1 is a block diagram of a generalized data processing system including a central processing unit which provides the computer controlled interactive display system that may be used in practicing the present invention.

Referring to FIG. 1, a typical data processing system is shown which may function as the computer controlled display terminal used in implementing the system of the present invention for providing enhanced access for physically impaired users to selectable items in a hierarchical arrangement by preliminary testing of user response time. A central processing unit (CPU) 10, such as any PC microprocessor in a PC available from IBM or Dell Corp., is provided and interconnected to various other components by system bus 12. An operating system 41 runs on CPU 10, provides control and is used to coordinate the function of the various components of FIG. 1. Operating system 41 may be one of the commercially available operating systems such as Microsoft's Windows98™ or WindowsNT™, as well as the UNIX or AIX operating systems. An application program, that will be subsequently described in detail, runs in conjunction with operating system 41 and provides output calls to the operating system 41, which, in turn, implements the various functions to be performed by the application programs 40 that include the program of the present invention providing impaired users with enhanced access for physically impaired users to selectable items in a hierarchical arrangement by preliminary testing of user response time which will be hereinafter described in greater detail.

A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network enabling the data processing system to communicate with other such systems over a Local Area Network (LAN) or Wide Area Network (WAN), including the Internet. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 2:
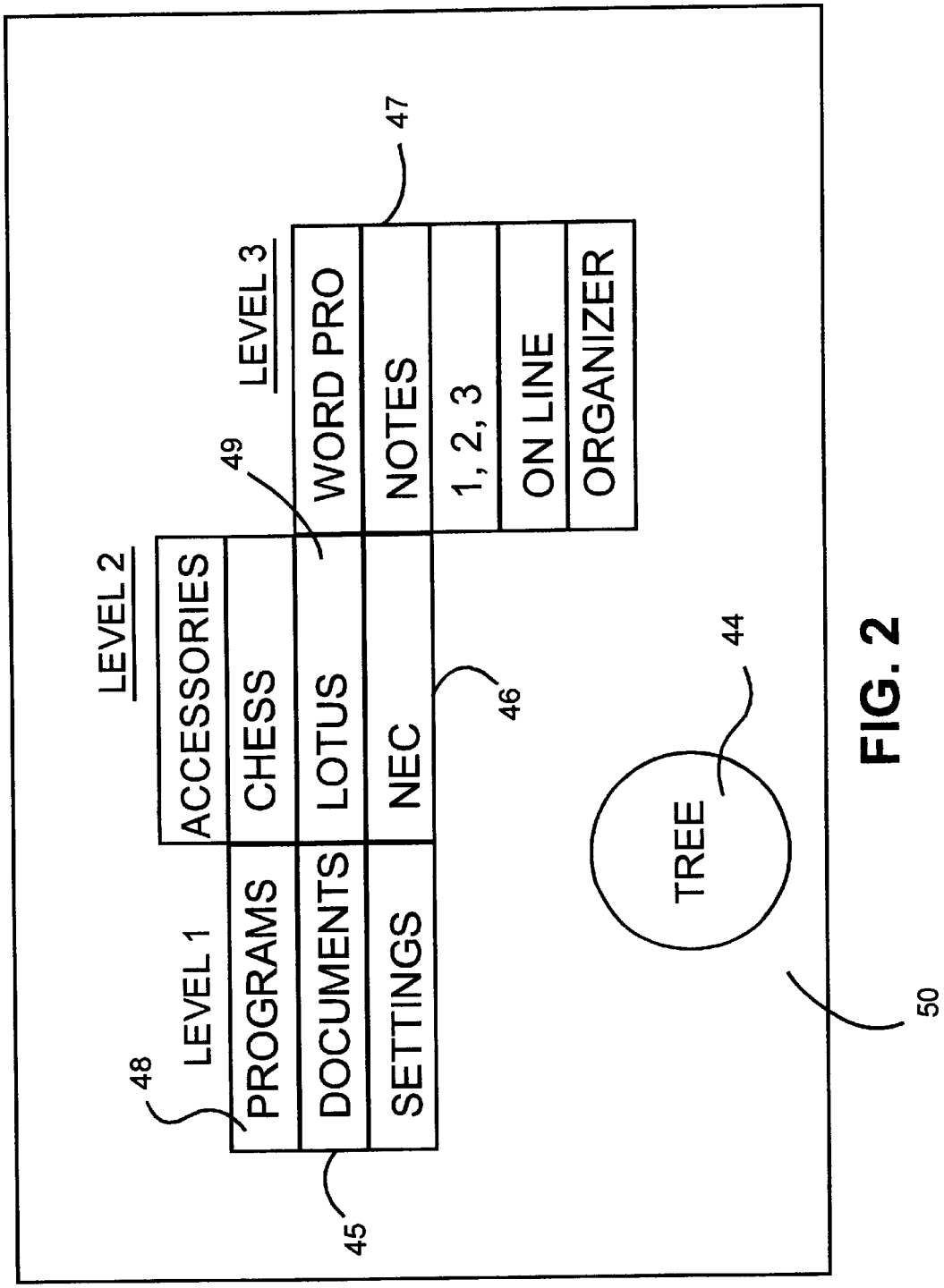
FIG. 2 is a diagrammatic view of a display screen illustrating three levels of conventional cascaded drop down menus in which cursor pointed selections have been made to drop down the third level shown.

In the diagrammatic illustration of FIG. 2, a display screen 50 is shown with a sequence of three cascading drop down menus as described in the above cross-referenced copending patent application: menu 45 (Level 1); menu 46 (Level 2); and menu 47 (Level 3). The sequence presents choices in menus of items representing categories of decreasing scope. In the sequence shown, the user has selected "PROGRAMS" from menu 45 which resulted in drop down menu 46 and "LOTUS" from menu 46 which resulted in drop down menu 47. At any point in this process the user could cursor to and select the "TREE" button 44 and thereby shift to the alternative hierarchical tree layout of tailored icons to be subsequently described with respect to FIG. 3. It is to be noted that the user may click on the TREE button at any point. He may do so initially even before he gets the first drop down menu 45. In such a case, he would get the whole tree displayed in FIG. 3 with all of its branches, i.e. at Level 1, all of the branches respectively from each of Doc icon 52 and Settings icon 53 right down to the third level, as well as at Level 2, all of the branches from each of NEC icon 57, Lotus icon 54, Chess icon 56 and Access icon 55 also down to Level 3. For convenience in illustration, Doc icon 52, Settings icon 53, NEC icon 57, Lotus icon 54, Chess icon 56 and Access icon 55 are shown with their downward branches cut off.

Figure 3:
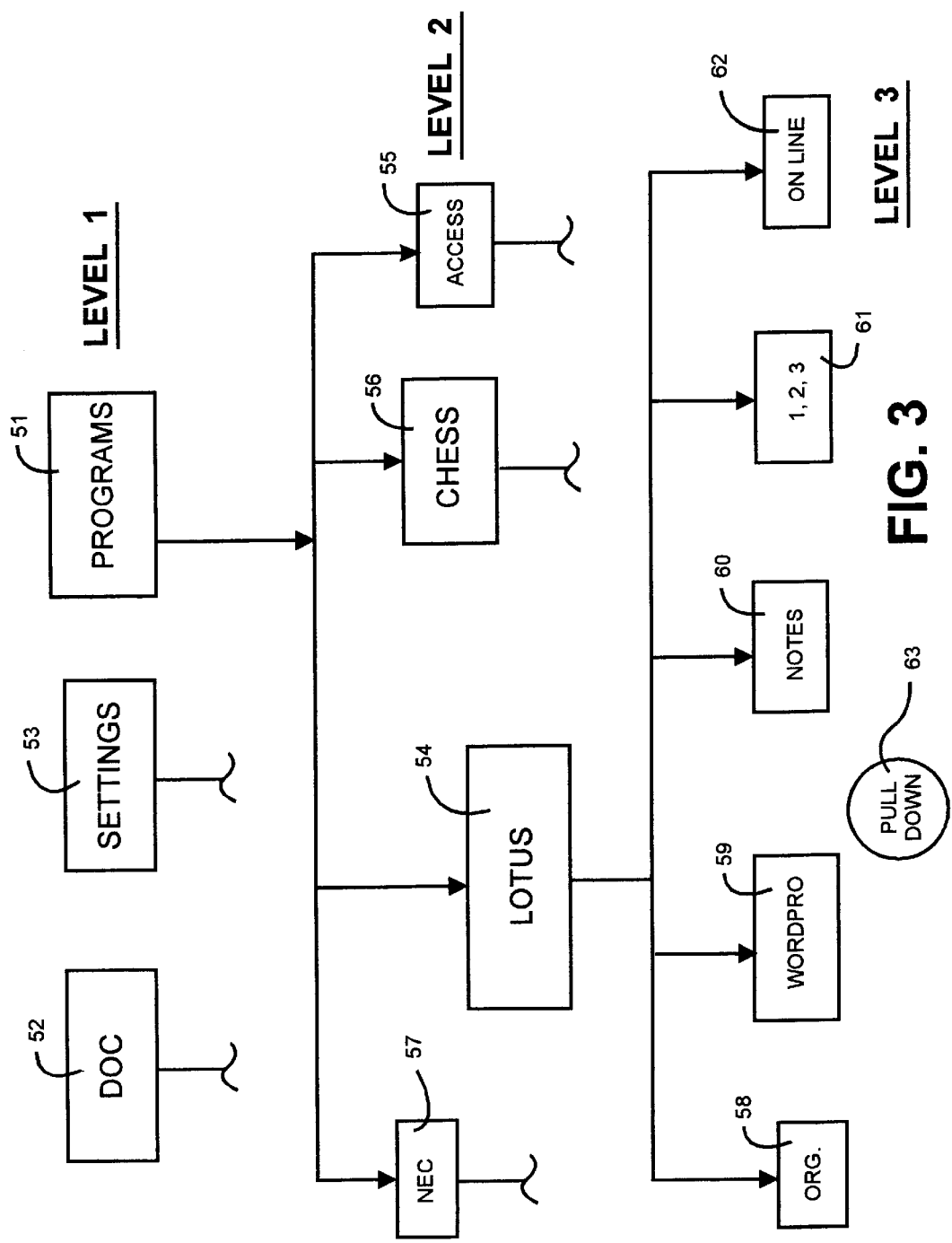
FIG. 3 is the diagrammatic display view of FIG. 2 after the user has selected to work with the alternative hierarchical tree of icons in the above cross-referenced copending application corresponding to the set of menus of FIG. 2.

Even if the user has commenced using the drop down menu sequence display of FIG. 2, should he find that he is having difficulty in scrolling and selecting through the drop down menus, he may then click on the TREE button 44 to thereby cause the display hierarchical tree of FIG. 3, also covered in the above cross-referenced copending patent application. Dependent on the needs and wishes of the user, the tree of FIG. 3 may be set up to show the complete tree, i.e. all of the icons branching from all of the icons at each of the levels right down to the bottom or third level in the illustration. On the other hand, if the user has already made choices from the drop down menus at one or two of the levels prior to selecting the TREE button 44, then the displayed tree may be set up to display only the icons already selected at levels corresponding to menus where selections have been made together with all of the icons at unselected levels.

At any point in the operation described with respect to FIG. 3, the user may return to the drop down or pull down menus of FIG. 2 by pressing the "Pull Down" button 63. This will conveniently return the user to the drop down menus at a menu item corresponding to the last icon selected in the tree of FIG. 3, which is also described in the above-mentioned cross-referenced copending application.

The icons 51 through 62 at Levels 1, 2 and 3 of the tree in FIG. 3 respectively correspond to the menu items at Levels 1, 2 and 3 in the cascading drop down menus in FIG. 2. However, the icons are varied substantially in size and spacing between icons to make such icons easier to perceive and to cursor to by any physically or visually impaired user. The sizes and spacing are tailored to the user's impediments relative to the user's needs in performing his work. The sizing and/or spacing of the icons in the tree of FIG. 3 may be set up or modified by anyone who sets up the computer interface for the specific user using standard icon moving and graphic techniques available in operating systems, such as the Windows series for expanding or contracting dimensions. Also, sizing and spacing of icons in the tree of FIG. 3 may be done dynamically by routines which monitor user behavior patterns and adjust sizing and/or spacing accordingly. For example, the tree of FIG. 3 may be set up in an initial or default pattern. Then, the user activity with respect to the specific icons may be monitored, e.g. the number of times that a user selects each icon may be counted and the size of the icons dynamically modified based upon such counts. In this respect, if it is found that a particular icon is rarely or never selected, it may be eliminated from the tree in order to provide for better spacing.

Figure 4:
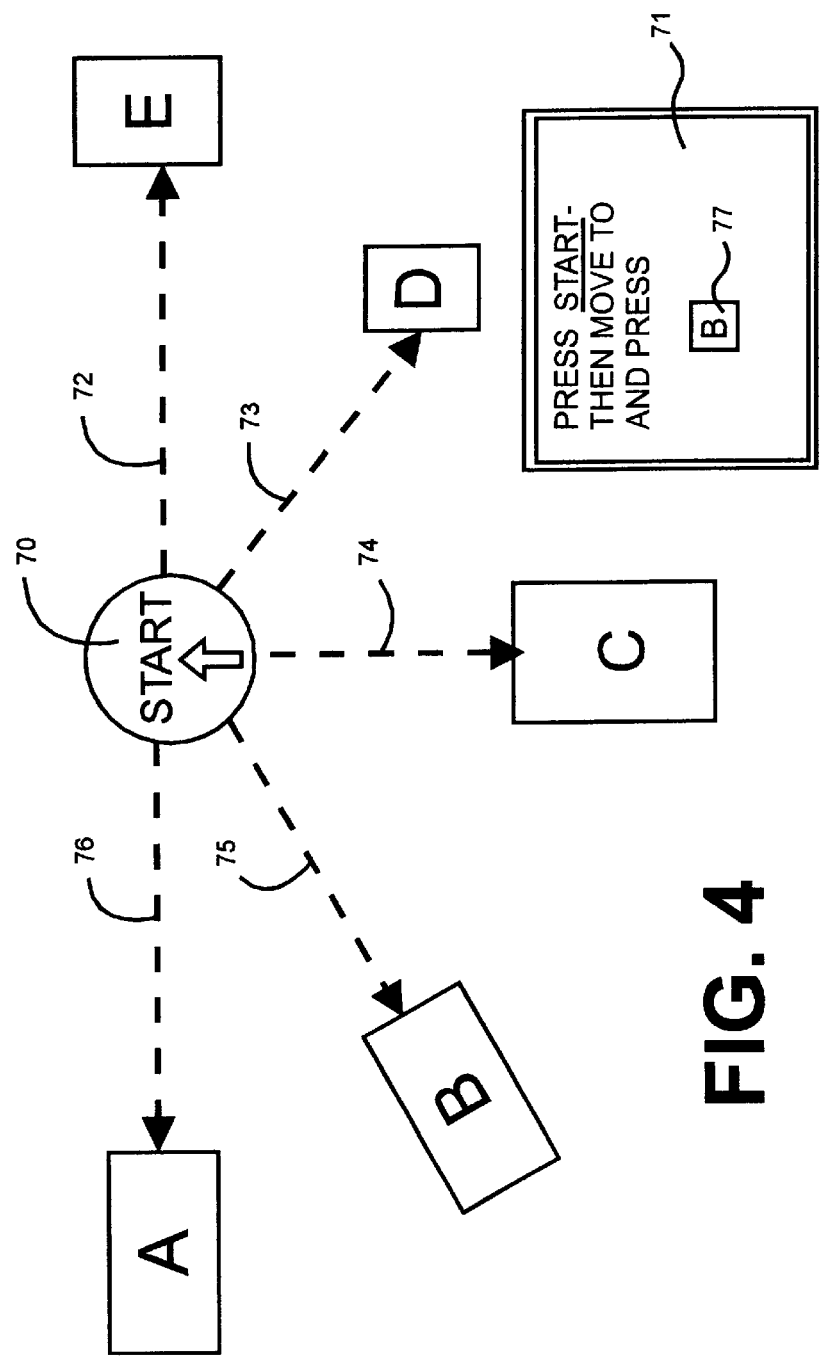
FIG. 4 is an illustration of a display screen with simplified user-interactive dialog that may be used to determine the ability of a user to select icons of varying size to determine optimum icon or object sizes.

In accordance with the present invention, the user may be given preliminary tests by the computer to determine his eye-hand coordination and the icons sized and spaced accordingly. FIG. 4 is a simplified illustration of such a test. In a preliminary display, there is a starting circle or point 70 into which the user initially moves the cursor. Five icons A, B, C, D and E of varying sizes but having respective paths, 72, 73, 74, 75 and 76, of equal distance from starting circle 70 are displayed. The user is then prompted through dialog panel 71 to move from the circle 70 to the specified icon as listed in box 77 and to press the icon. The amount of time taken is recorded. The user is then prompted to return the cursor to Start 70, after which the user is prompted to move to another icon and the time is recorded. This procedure is repeated until a reasonable sampling is obtained. Since the distances of paths 72 through 76 traversed by the cursor are the same, the differences in average time have to be dependent upon the variation in the sizes of icons A through E. The system has predetermined what a reasonable time is and, thus, selects the icon size that results in a time closest to such a predetermined time. This is only intended to be a simplified illustration of determining user capability and it is understood that commercial embodiments may be more complex.

Figure 5:
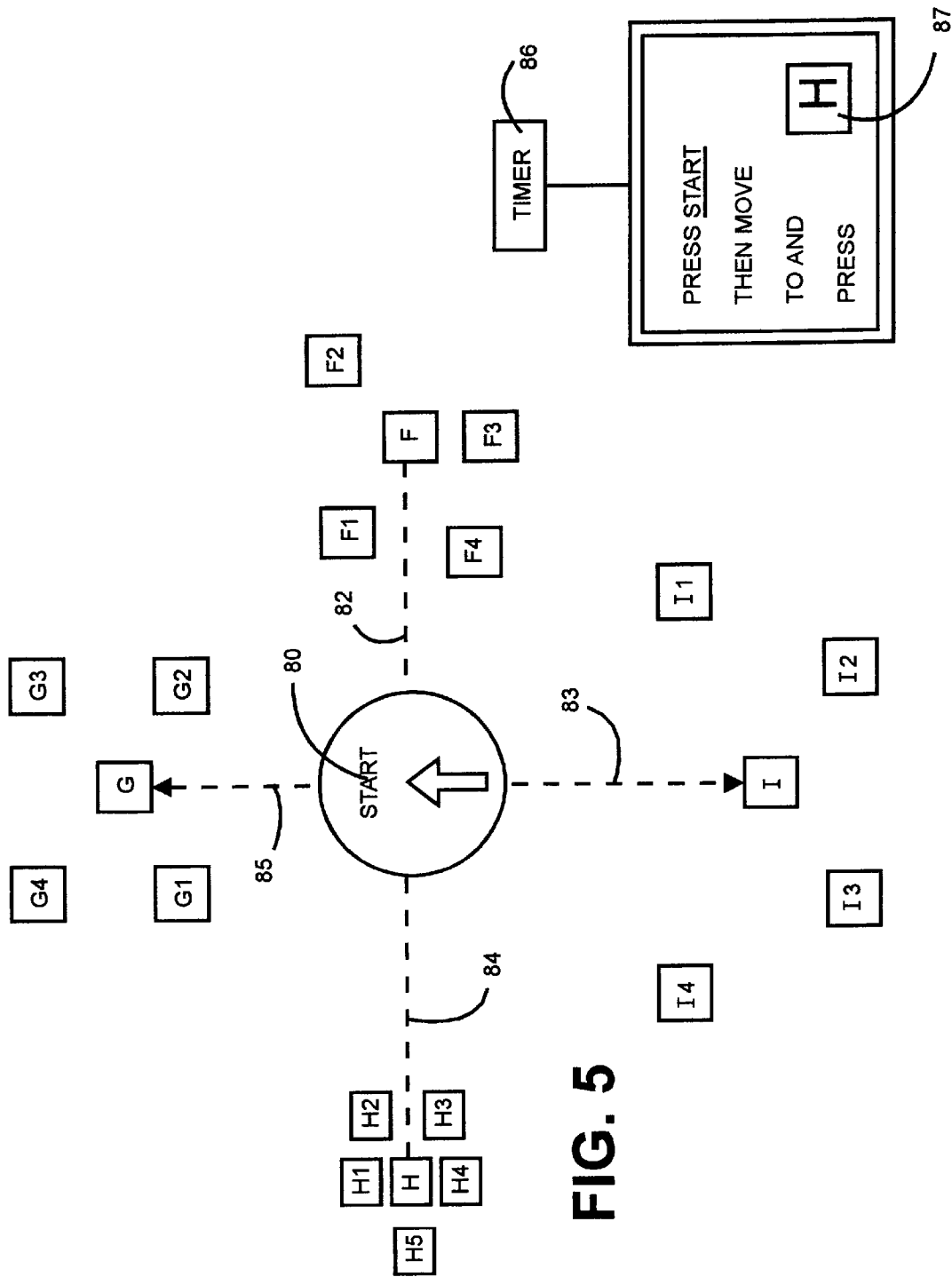
FIG. 5 is an illustration of a display screen with simplified user-interactive dialog that may be used to determine the ability of a user to select icons of varying spacing to determine optimum icon spacing.

FIG. 5 is also a simplified illustration of another test. In a preliminary display, there is a starting circle or point 80 into which the user initially moves the cursor. Four icons F, G, H and I of the same size and having respective paths, 82, 83, 84 and 85 of equal distance from starting circle 80 are displayed. The differences in Icons F, G, H and I are in their spacing from surrounding icons: F1-4 spaced from F; G1-4 spaced from G; H1-5 spaced from H; and I1-4 spaced from I. The user is then prompted through dialog panel 81 to move from the circle 80 to the specified icon as listed in box 87 and to press the icon. The amount of time taken is recorded via timer 86. The user is then prompted to return the cursor to Start 80, after which the user is prompted to move to another icon and the time is recorded. This procedure is repeated until a reasonable sampling is obtained. Since the distances of paths 82 through 85 traversed by the cursor are the same, the differences in average time have to be dependent upon the variation in the spacing of icons F through I from their neighboring icons. The system has predetermined what a reasonable time is and, thus, selects the spacing that results in a time closest to such a predetermined time.

In determining optimum spacing and icon size to make for user selection speeds approaching what is predetermined to be normal speed. A simplified example of object oriented pseudocode to coordinate these three parameters as a result of the preliminary testing follows.

```
Class  CalculateSizeandSpacing {
    for all elements
        get all user response / /size, space & time
        calculateOKsize
        calculateOKspacing
}
Class  UserResponse {
    int numberOFTries;
}
Class  LineSpaceUserResponse extends UserResponse {
    int distance;
}
Class  MenuItemSizeUserResponse extends UserResponse {
    int x;
    int y;
}
Class  TimeUserResponse extends UserReponse {
    long timerequired;
}
```

While the testing has been described as preliminary, it may also be implemented during the system operation. Events may be listened for which are indicative that the user is having trouble with his selection of items or icons. One such event may be when the user's selection responses are falling below some predetermined levels. Such events would then trigger the preliminary tests to determine better conditions.

One of the preferred implementations of the present invention is as an application program made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user-interactive display system, a display interface implementation for providing access for physically impaired users to selectable items in a hierarchical arrangement comprising:

means for the preliminary testing of a user response time in moving a user controlled on-screen pointer from a start point over an equal distance to each of a plurality of said selectable items of different sizes; and means responsive to said preliminary testing means for sizing a set of items in said hierarchical arrangement to provide said user with enhanced access to said items in said set.

2. The display interface implementation of claim 1 wherein said means for sizing, sizes each of the items in the hierarchical arrangement in proportion to the respective user response times to said plurality of selectable items of different sizes insaid means for preliminary testing.

3. In a computer controlled user-interactive display system, a display interface implementation for providing access for physically impaired users to selectable items in a hierarchical arrangement comprising:

means for the preliminary testing of a user response time in moving a user controlled on-screen pointer from a start point over an equal distance to each of a plurality of said selectable items wherein each item is located within a region of different item layout spacing; and means responsive to said preliminary testing means for spacing a set of items in said hierarchical arrangement to provide said user with enhanced access to said items in said set.

4. The display interface implementation of claim 3 wherein said means for spacing, spaces each of the items in the hierarchical arrangement in proportion to the respective user response times to an item in said plurality of selectable items in said means for preliminary testing.

5. The display interface of claim 2 further including:

means for listening for predetermined events in the operation of said display system; and means responsive to said predetermined events for triggering said means for preliminary testing during said system operation.

6. The display interface of claim 4 further including:

means for listening for predetermined events in the operation of said display system; and means responsive to said predetermined events for triggering said means for preliminary testing during said system operation.

7. A method for providing access for physically impaired users to selectable items in a hierarchical arrangement in computer controlled user-interactive display systems comprising:

preliminarily testing of a user response time in moving a user controlled on-screen pointer from a start point over an equal distance to each of a plurality of said selectable items of different sizes; and sizing a set of items in said hierarchical arrangement to provide said user with enhanced access to said items in said set responsive to said preliminary testing.

8. The method of claim 7 wherein each of the items in the hierarchical arrangement is sized in proportion to the respective user response times to said plurality of selectable items of different sizes insaid means for preliminary testing.

9. A method for providing access for physically impaired users to selectable items in a hierarchical arrangement in computer controlled user-interactive display systems comprising:

preliminarily testing a user response time in moving a user controlled on-screen pointer from a start point over an equal distance to each of a plurality of said selectable items wherein each item is located within a region of different item layout spacing; and spacing a set of items in said hierarchical arrangement to provide said user with enhanced access to said items in said set responsive to said preliminary testing.

10. The method of claim 9 wherein each of the items in the hierarchical arrangement is spaced proportion to the respective user response times to an item in said plurality of selectable items in said means for preliminary testing.

11. The method of claim 8 further including the steps of:

listening for predetermined events in the operation of said display system; and triggering said preliminary testing during said system operation responsive to said predetermined events.

12. The method of claim 10 further including the steps of:

listening for predetermined events in the operation of said display system; and triggering said preliminary testing during said system operation responsive to said predetermined events.

13. A computer program having program code included on a computer readable medium for providing access for physically impaired users to selectable items in a hierarchical arrangement in computer controlled user-interactive display systems comprising:

means for the preliminary testing of a user response time in moving a user controlled on-screen pointer from a start point over an equal distance to each of a plurality of said selectable items of different sizes; and means responsive to said preliminary testing means for sizing a set of items in said hierarchical arrangement to provide said user with enhanced access to said items in said set.

14. The computer program of claim 13 wherein said means for sizing, sizes each of the items in the hierarchical arrangement in proportion to the respective user response times to said plurality of selectable items of different sizes insaid means for preliminary testing.

15. A computer program having program code included on a computer readable medium for providing access for physically impaired users to selectable items in a hierarchical arrangement in computer controlled user-interactive display systems comprising:

means for the preliminary testing of a user response time in moving a user controlled on-screen pointer from a start point over an equal distance to each of a plurality of said selectable items wherein each item is located within a region of different item layout spacing; and means responsive to said preliminary testing means for spacing a set of items in said hierarchical arrangement to provide said user with enhanced access to said items in said set.

16. The computer program of claim 15 wherein said means for spacing, spaces each of the items in the hierarchical arrangement in proportion to the respective user response times to an item in said plurality of selectable items in said means for preliminary testing.

17. The computer program of claim 14 further including:

means for listening for predetermined events in the operation of said display system; and means responsive to said predetermined events for triggering said means for preliminary testing during said system operation.

18. The computer program of claim 16 further including:

means for listening for predetermined events in the operation of said display system; and means responsive to said predetermined events for triggering said means for preliminary testing during said system operation.

* * * * *